United States Patent
Kim et al.

(10) Patent No.: US 12,541,323 B2
(45) Date of Patent: Feb. 3, 2026

(54) STORAGE DEVICE SUPPORTING RANDOM WRITE AREA ACCESSIBLE FROM HOST AND METHOD OF OPERATING THE SAME

(71) Applicant: Samsung Electronics Co., Ltd., Suwon-si (KR)

(72) Inventors: Junho Kim, Suwon-si (KR); Jea-Young Kwon, Suwon-si (KR); Jaesub Kim, Suwon-si (KR); Yangwoo Roh, Suwon-si (KR); Hongmoon Wang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/459,471

(22) Filed: Sep. 1, 2023

(65) Prior Publication Data

US 2024/0220158 A1 Jul. 4, 2024

(30) Foreign Application Priority Data

Dec. 28, 2022 (KR) .................. 10-2022-0187918

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)
(58) Field of Classification Search
CPC ............................ G06F 3/0679; G06F 3/0656
See application file for complete search history.

(56) References Cited

U.S. PATENT DOCUMENTS

| 11,579,775 | B2 | 2/2023 | Kim et al. |
| 2015/0106557 | A1* | 4/2015 | Yu ................. G11C 13/0004 |
| | | | 711/103 |
| 2021/0049114 | A1* | 2/2021 | Kim ................... G06F 13/28 |
| 2021/0318820 | A1 | 10/2021 | Jin et al. |
| 2021/0397383 | A1 | 12/2021 | Parker et al. |

(Continued)

FOREIGN PATENT DOCUMENTS

KR    10-2018-0044635 A    5/2018

OTHER PUBLICATIONS

Wikipedia, Circular Buffer, Mar. 2021 [retrieved from internet Sep. 12, 2024][<URL:https://web.archive.org/web/20210322231741/https://en.wikipedia.org/wiki/Circular_buffer>] (Year: 2021).*

(Continued)

*Primary Examiner* — Nicholas A. Paperno
(74) *Attorney, Agent, or Firm* — Harness, Dickey & Pierce, P.L.C.

(57) ABSTRACT

A storage device includes a nonvolatile memory device including a plurality of zones, each of the plurality of zones including a plurality of logical addresses, and a storage controller configured to control the nonvolatile memory. The storage controller includes at least one buffer directly accessible by a host device, the buffer including at least one random write area and a write pointer. The host device may perform a write operation on the random write area without requiring an additional write command associated with the write operation to be executed between the host device and the nonvolatile memory device, thereby decreasing the write operation time.

17 Claims, 12 Drawing Sheets

(56) References Cited

U.S. PATENT DOCUMENTS

| | | |
|---|---|---|
| 2022/0050599 A1 | 2/2022 | Bjorling et al. |
| 2022/0137817 A1 | 5/2022 | Kwak et al. |
| 2022/0137844 A1 | 5/2022 | Goss et al. |
| 2022/0229596 A1 | 7/2022 | Jung |
| 2022/0269611 A1 | 8/2022 | Guda et al. |
| 2022/0283900 A1 | 9/2022 | Gole et al. |
| 2022/0300195 A1* | 9/2022 | Bert .................. G06F 3/0679 |
| 2023/0161500 A1* | 5/2023 | Doucette ............ G06F 3/0688 |
| | | 711/5 |
| 2023/0185451 A1* | 6/2023 | Nalluri ............... G06F 3/0608 |
| | | 711/104 |
| 2024/0094903 A1* | 3/2024 | Kavirayani ........ G06F 3/0631 |

OTHER PUBLICATIONS

Extended European Search Report for corresponding European Patent Application No. 23196908.0 issued on Feb. 12, 2024.

\* cited by examiner

FIG. 3

| WP Table | |
|---|---|
| Zone | WP |
| 0 | WP1 |
| 2 | WP2 |
| 3 | WP3 |
| ⋮ | ⋮ |
| x-1 | WPx-1 |

| RWA Buffer | |
|---|---|
| Zone | Write Data |
| 0 | D1 |
| 2 | D2 |
| 3 | D3 |
| ⋮ | ⋮ |
| x-1 | Dx-1 |

1121

STORAGE DEVICE SUPPORTING RANDOM WRITE AREA ACCESSIBLE FROM HOST AND METHOD OF OPERATING THE SAME

CROSS-REFERENCE TO RELATED APPLICATION(S)

This U.S. non-provisional application claims the benefit of priority under 35 U.S.C. § 119 to Korean Patent Application No. 10-2022-0187918, filed on Dec. 28, 2022, in the Korean Intellectual Property Office, the disclosure of which is incorporated herein by reference in its entirety.

BACKGROUND

Various example embodiments of the inventive concepts relate to a storage device supporting a random write area accessible from a host device, a system including the storage device, and/or a method of operating the storage device, etc.

A storage device may process a command transmitted from a host (e.g., a host device) through a command interface and may perform an operation on a nonvolatile memory according to the command. As desired and/or necessary, the host may have to write data of a unit smaller than a sector unit size (for example, 512 bytes), such as data of a byte unit size, however, the host is required to transmit data using a command interface based on a logical address using the larger unit size than the desired byte unit size, e.g., using a logical address which is a sector unit size.

SUMMARY

Various example embodiments provide a storage device supporting a random write area accessible from a host device, a system including the storage device, and/or a method of operating the storage device, etc.

According to at least one example embodiment, a storage device includes a nonvolatile memory device including a plurality of zones, each of the plurality of zones including a plurality of logical addresses, and a storage controller configured to control the nonvolatile memory, the storage controller including at least one buffer directly accessible by a host device, the buffer including at least one random write area and a write pointer, the write pointer configured to store a position indicating a starting logical address of the random write area, and the buffer configured to write data into the random write area based on the position of the write pointer in response to the buffer receiving the write data from the host device.

According to at least one example embodiment, a method of operating a storage device controlling a nonvolatile memory device includes receiving write data from a host device, reading a position of a write pointer loaded into a buffer, writing the write data in a random write area based on the position of the write pointer, the random write area included in the buffer, and flushing the write data and the write pointer to the nonvolatile memory device in response to detection of an interruption of power supplied to the storage device, the random write area is an area of the buffer corresponding to a plurality of zones of the nonvolatile memory device, each of the zones including a plurality of logical addresses, and the write pointer is configured to store a position indicating a starting logical address of the random write area.

According to at least one example embodiment, a storage system includes a host device and a storage device connected to the host device. The storage device includes a nonvolatile memory device including a nonvolatile memory device including a plurality of zones, each of the zones including a plurality of logical addresses, and a storage controller including a buffer, the storage controller configured to control the nonvolatile memory device, the buffer configured to be directly accessible from the host device, and the buffer includes a random write area and a write pointer, the write pointer configured to store a position indicating a starting logical address of the random write area, and the buffer is further configured to write write data into the random write area based on the position of the write pointer in response to the buffer receiving the write data from the host device.

BRIEF DESCRIPTION OF DRAWINGS

The above and other aspects, features, and advantages of the example embodiments of the inventive concepts will be more clearly understood from the following detailed description, taken in conjunction with the accompanying drawings.

FIG. 3 is a diagram illustrating a write pointer table according to at least one example embodiment.

FIG. 4 is a diagram illustrating a random write area buffer according to at least one example embodiment.

DETAILED DESCRIPTION

Hereinafter, various example embodiments will be described with reference to the accompanying drawings.

Figure 1:
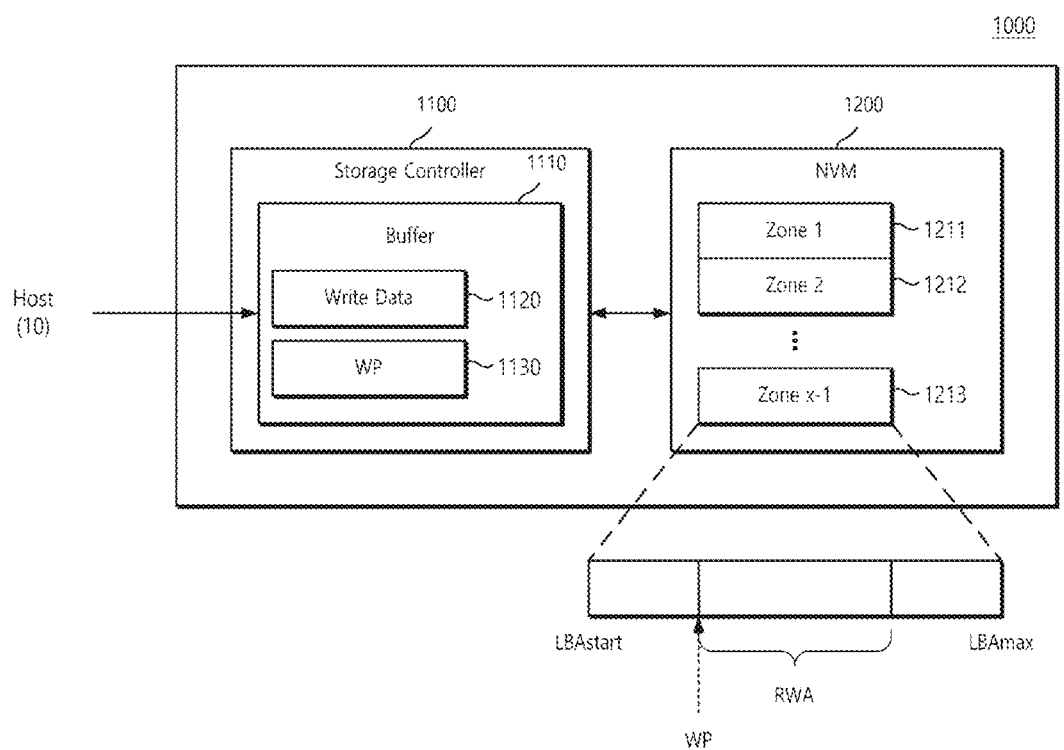
FIG. 1 is a diagram illustrating a storage device according to at least one example embodiment.

FIG. 1 is a diagram illustrating a storage device according to at least one example embodiment.

Referring to FIG. 1, a storage device may include at least one storage controller 1100 and/or at least one nonvolatile memory 1200 (e.g., a nonvolatile memory device, etc.), etc., but the example embodiments are not limited thereto, and for example, the storage device may include a greater or lesser number of constituent components, etc.

The storage device 1000 may receive at least one command from the host 10 (e.g., at least one host device, etc.) and may perform at least one operation according to and/or based on the command through the nonvolatile memory 1200. For example, the command may instruct a write operation, a read operation, an erase operation, and/or a flush operation, etc., but is not limited thereto. The flush operation may be an operation of requesting data in a volatile write cache to be written into the nonvolatile memory 1200, etc.

Each command may include logical address information associated with and/or corresponding to the nonvolatile memory 1200 in which an operation is performed according to a command. When a plurality of commands are transmitted from the host 10, logical addresses of the commands may be sequential or random. In at least one example embodiment, when a command is a write command instructing a write operation, the storage device 1000 may process a random write operation as well as a sequential write operation.

In at least one example embodiment, the storage device 1000 may be a solid-state drive (SSD), a universal flash storage (UFS), and/or an embedded multimedia card (eMMC), etc. Additionally, in at least one example embodiment, the storage device 1000 may be implemented as a secure digital (SD) card, a micro SD card, a memory stick, a chip card, a universal serial bus (USB) card, a smart card, a compact flash (CF) card, or the like, but the example embodiments are not limited thereto.

In at least one example embodiment, the storage device 1000 may be implemented in a form factor, such as 3.5 inch, 2.5 inch, 1.8 inch, M.2, U.2, U.3, an enterprise and data center SSD form factor (EDSFF), a new form factor 1 (NF1), and/or other form factors.

In at least one example embodiment, the storage device 1000 may be implemented using, for example, a serial advanced technology attachment (SATA), a serial attached small computer system interface (SCSI), a serial attached SCSI (SAS), and/or interfaces similar thereto, and may be implemented using, for example, peripheral component interconnect (PCI), PCI express (PCIe), nonvolatile memory express (NVMe), NVMe-over-Fabrics (NVMe-oF), Ethernet, InfiniBand, Fiber Channel, and/or a protocol similar thereto.

The storage controller 1100 controls the overall operation of the storage device 1000 including the nonvolatile memory 1200. In at least one example embodiment, the storage controller 1100 may process various operations associated with data, stored in the nonvolatile memory 1200, in units of zones. According to some example embodiments, the storage controller 1100 may be implemented as processing circuitry. Processing circuitry may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The nonvolatile memory 1200 may include a plurality of zones 1211, 1212, and/or 1213, but is not limited thereto. A zone may include a plurality of logical addresses (for example, a logical block address (LBA)). For example, the plurality of zones 1211, 1212, and 1213 may be continuous and non-overlapping, but are not limited thereto. For example, the plurality of zones 1211, 1212, and 1213 may have the same size or different sizes.

A namespace, including a plurality of zones, may be referred to as a zoned namespace (ZNS). A namespace may be a set of nonvolatile memories 1200 (e.g., a plurality of nonvolatile memory devices, etc.), and may be a processing unit viewed by the host 10. For example, the ZNS may be defined as a namespace, associated with a ZNS command, among namespaces, but the example embodiments are not limited thereto.

Each of the plurality of zones 1211, 1212, and 1213 may sequentially store data therein, but are not limited thereto. For example, the plurality of zones 1211, 1212, and 1213 may not randomly store a plurality of pieces of data, but may sequentially store the plurality of pieces of data from a start storage location of each zone (for example, LBAstart defined as a zone starting logical block address (ZSLBA)), but are not limited thereto. For example, a zone may be an area set to be sequentially writable. Accordingly, when the plurality of pieces of data are written in the nonvolatile memory 1200 through the storage controller 1100, the plurality of pieces of data may be sequentially written in each of the plurality of zones 1211, 1212, and 1213, etc.

A maximum number of logical blocks (for example, LBAmax defined as zone capacity (ZCAP)), included in each of the plurality of zones 1211, 1212, and 1213, may be set and/or configured by a system including the storage device 1000, the host 10, and/or a user, etc.

Each of the plurality of zones 1211, 1212, and 1213 may include at least one random write area RWA (and/or at least one zone random write area ZRWA) set to be randomly writable and/or overwritable. The random write area RWA may be defined as an area having a desired and/or predetermined size from a write pointer (WP) 1130 for a zone in terms of the zone, and/or may be defined as a type of area, in which data is stored before being written in a random write area RWA of a physical zone, in a buffer 1110 of the storage controller 1100 in terms of the buffer 1110, but the example embodiments are not limited thereto, and for example, the buffer 1110 may be located in a different location, e.g., on the nonvolatile memory 1200, etc. In the zone, an area corresponding to the random write area RWA is randomly writable as well as sequentially writable. Data to be written in the random write area RWA may be stored in the buffer 1110, included in the storage controller 1100, and may then be stored in a logical block corresponding to the random write area RWA, among zones included in the nonvolatile memory 1200, through a flush operation (also referred to as a "commit" operation).

The nonvolatile memory 1200 is controlled by the storage controller 1100. The nonvolatile memory 1200 may store data transmitted from the host 10, data generated by the storage device 1000, and/or various types of data written by the storage controller 1100, etc. In at least one example embodiment, the nonvolatile memory 1200 may be a nonvolatile memory, such as a NAND flash memory, a phase-change random access memory (PRAM), a resistance random access memory (RRAM), a nano-floating gate memory (NFGM), a polymer random access memory (PoRAM), a magnetic random access memory (MRAM), a ferroelectric random access memory (FRAM), or the like, but the example embodiments are not limited thereto.

The storage controller 1100 may perform a write operation on one or more of the plurality of zones 1211, 1212, and 1213 included in the nonvolatile memory 1200, and the random write area RWA, an area set to be randomly writable to the plurality of zones 1211, 1212, and 1213, etc. The storage controller 1100 may include a buffer 1110 for the write operation on the random write area RWA, but the example embodiments are not limited thereto.

In at least one example embodiment, the host 10 may directly access the buffer 1110, but the example embodiments are not limited thereto. The buffer 1110 may be an area, having write/read memory purposes, in the storage controller 1100, but is not limited thereto. The buffer 1110 may be a memory area shared by the host 10 and the storage device 1000, and thus the host 10 may also access and utilize the buffer 1110 as if the buffer 1110 were a memory area of the host 10, or vice versa. The buffer 1110 may be accessed in units of a desired and/or predetermined data size. For example, a unit of the desired and/or predetermined data may be one or more bytes, but the example embodiments are not limited thereto.

Write data 1120 to be stored in the random write area RWA, transmitted by and/or through the host 10, may be stored in the buffer 1110. For example, the buffer 1110 may store the write data 1120 for each of the plurality of zones 1211, 1212, and 1213, but is not limited thereto.

In at least one example embodiment, when a redundant array of inexpensive disk (RAID) is supported, RAID parity data and/or system log data may be used to detect and/or correct an error in data. For example, the write data 1120 to be stored in the random write area RWA may be RAID parity data and/or system log data, but the example embodiments are not limited thereto.

A write pointer 1130 for each of the plurality of zones 1211, 1212, and 1213 may be stored in the buffer 1110. The write pointer 1130 may indicate a next writeable logical address within a specific zone. When the random write area RWA is set in each zone, the write pointer 1130 may indicate a starting logical address of the random write area RWA, among a plurality of logical addresses included in a zone. The write pointer 1130 may be distinguished from the ZSLBA which indicates a starting point of a zone itself. However, when a next writable logic address is LBAstart, the LBAstart and the write pointer 1130 may point to the same logical address and/or memory location. The write pointer 1130, indicating a starting logical address of the random write area RWA, may be understood as a type of offset information. For example, the buffer 1110 may store the write pointer 1130 in a write pointer table 1131 in which a plurality of write pointers 1130 is mapped to the plurality of zones 1211, 1212, and 1213, respectively.

Hereinafter, an operation of the storage device 1000 according to at least one example embodiment will be described. When the host 10 transmits write data 1120 to be written in the random write area RWA to the storage device 1000, the buffer 1110 may store the write data 1120. For example, when the buffer 1110 is accessible in units of bytes (e.g., byte-based units), the host 10 may write the write data 1120 in the buffer 1110 in units of bytes (e.g., byte-based units).

Also, the buffer 1110 may store a write pointer 1130 corresponding to the stored write data 1120. As described above, the write pointer 1130 indicates a starting logical address of the random write area RWA. Accordingly, the write data 1120 may be stored in the buffer 1110 to correspond to a logical location corresponding to the random write area RWA.

Then, when the write data 1120 stored in the buffer 1110 is flushed to the nonvolatile memory 1200, the storage controller 1100 may generate a write pointer 1130 in at least one zone included in the nonvolatile memory 1200. The write data 1120 may be flushed from a logical block corresponding to the write pointer 1130.

The buffer 1110 may be directly accessed by the host 10 as described above, so that the host 10 may confirm the write pointer 1130 stored in the buffer 1110. Accordingly, the host 10 may write the write data 1120 based on the write pointer 1130.

According to some example embodiments, write data 1120 to be stored in the random write area RWA may be stored in the buffer 1110, which is directly accessible to the host 10. Accordingly, a write operation may be performed on the random write area RWA without an additional write command interface for the write operation, so that convenience of a side of the host 10 may be provided, the number of write commands issued is reduced, and the delay caused by a command interaction may be reduced. In addition, when an accessible unit of the host 10 to the buffer 1110 is a byte, the host 10 may perform a write operation in units of bytes, which is smaller than the units of data used in input/output operations of conventional memory devices and/or smaller than the units of data used by a command interface of memory devices according to the related art.

Figure 2:
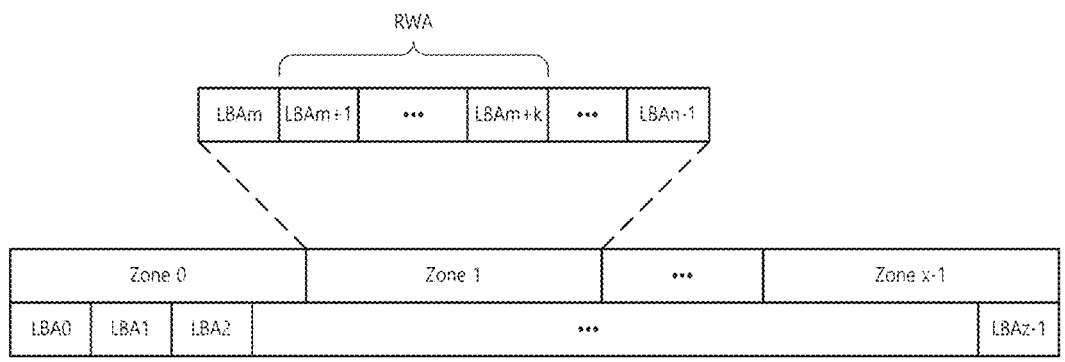
FIG. 2 is a diagram illustrating zones according to at least one example embodiment.

FIG. 2 is a diagram illustrating zones according to at least one example embodiment.

Referring to FIG. 2, one or more zones Zone0, Zone1 to Zonex−1 (where x is a positive integer) may be included in the nonvolatile memory 1200. Each zone may include a plurality of logical addresses, for example, a plurality of LBAs (LBA0, LBA1, LBA2 to LBAz−1), as illustrated in the drawing, but the example embodiments are not limited thereto.

For example, a single zone Zone1 may include LBAm to LBAn−1, among LBAs (LBA0, LBA1, LBA2 to LBAz−1) included in all x zones, but the example embodiments are not limited thereto. The zones may have the same size or have different sizes. If the zones have the same size, all of the zones may have as many sizes as the number of LBAs included in LBAm to LBAn−1, but are not limited thereto.

Each zone may be defined as ZSLBA and ZCAP, as described above. For example, ZSLBA of Zone0 may be LBA0, as illustrated in the drawing. ZCAP of Zone1 may be the number of LBAs included in LBAm to LBAn−1, etc.

In addition, a random write area RWA may be set in each zone, but the example embodiments are not limited thereto. Among a plurality of LBAs included in a single zone, some LBAs (for example, LBAm+1 to LBAm+k) may be assigned to the random write area RWA. A plurality of pieces of data are sequentially written in each zone, but may be sequentially or randomly written in the random writing area RWA, and may be overwritten therein.

FIG. 3 is a diagram illustrating a write pointer table according to at least one example embodiment.

Referring to FIG. 3, the write pointer table 1131 may be stored in the buffer 1110, but is not limited thereto. In the write pointer table 1131, write pointers WP1 to WPx−1 may be mapped for each zone (e.g., each of Zone0 to Zonex−1). The write pointers WP1 to WPx−1 mapped for each zone may be defined based on the random write area RWA set for each zone.

The write pointer table 1131 may be updated whenever the random write area RWA is changed. For example, in the case of Zone0, a current write pointer may be mapped to WP1, but when the random write area RWA set for Zone0 is changed (e.g., reset, updated, etc.), WP1 may also be changed (e.g., updated) to another memory address (e.g., memory location, etc.). In other words, when the boundaries of the random write area RWA corresponding to Zone0 are updated, the value of the WP1 may also be updated.

The write pointer table 1131 may be regarded as metadata for write data 1120, and the write data 1120 may be defined as user data. The write pointer table 1131 and/or meta data, may be flushed to the nonvolatile memory 1200, similar to user data.

Since the host 10 may directly access the buffer 1110, the host 10 may read the write pointer table 1131 to obtain the write pointer 1130 for each zone. The host 10 may write the write data 1120 in the buffer 1110 based on the read write pointer table 1131.

FIG. 4 is a diagram illustrating a random write area buffer 1121 according to at least one example embodiment.

Referring to FIG. 4, the random write area buffer 1121 may store write data D1 to Dx−1 for each zone (e.g., each of Zone0 to Zonex−1). The random write area buffer 1121 may refer to a space in which the write data D1 to Dx−1 are stored for each zone in the buffer 1110. The host 10 may directly access the random write area buffer 1121 to store write data D1 to Dx−1 for each zone, but the example embodiments are not limited thereto. The stored write data D1 to Dx−1 may be flushed to the nonvolatile memory 1200 for each zone.

The write data D1 to Dx−1 stored in the random write area buffer 1121 may be sequentially and/or randomly written through the host 10, and/or may be overwritten. The write data D1 to Dx−1 may be explicitly or implicitly flushed to the nonvolatile memory 1200.

In at least one example embodiment, the random write area buffer 1121 may be a submission queue (SQ) stored in the buffer 1110, such that the host 10 may directly access the random write area buffer 1121, but the example embodiments are not limited thereto. When the random write area buffer 1121 is an SQ, the SQ may also be provided for each zone and the host 10 may directly store write data and/or a write command, including address information on the write data and/or write data, in the SQ for each zone.

According to some example embodiments, data may be written in the random write area RWA which may be directly accessed by the host 10, unlike the related art in which an SQ is directly stored in a memory of a host, but is not limited thereto. Therefore, data may be written in the random write area RWA without an operation associated with a command interface including a fetch from the SQ, etc.

Figure 5:
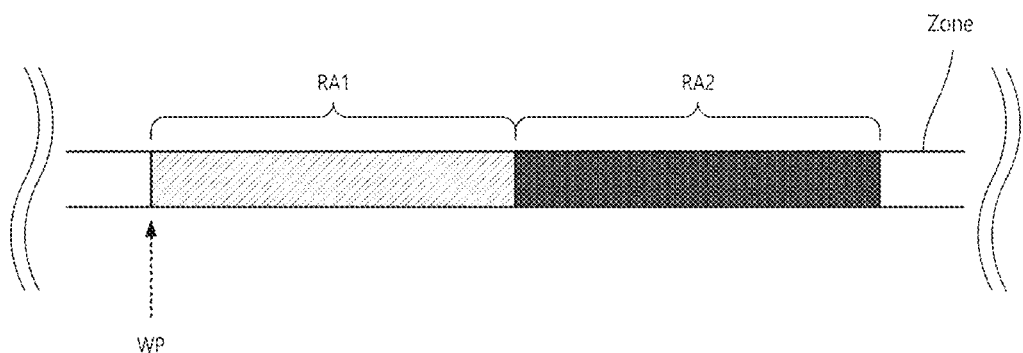
FIG. 5 is a diagram illustrating a random writing area according to at least one example embodiment.

FIG. 5 is a diagram illustrating a random write area according to at least one example embodiment.

Referring to FIG. 5, a random write area RWA may include a plurality of random areas, such as a first random area RA1 and a second random area RA2 sequentially defined from the first random area RA1, but is not limited thereto. The first random area RA1 may have a logical address as a starting point which corresponds to a position of a write pointer WP in a zone. When the write pointer 1130 has a value which is the same as the ZSLBA, the first random area RA1 may be defined from LBAstart.

The first random area RA1 and the second random area RA2 may have the same size or different sizes. Write data 1120 may be sequentially or randomly written in each of the first random area RA1 and the second random area RA2.

The write data 1120 stored in the first random area RA1 may be stored for a desired period of time in the first random area RA1 and then flushed to the nonvolatile memory 1200 in response to a request (e.g., a flush command, commit command, etc.) of the host 10.

Unlike the first random area RA1, the write data 1120 stored in the second random area RA2 may be directly flushed, or in other words, the write data 1120 stored in the second random area RA2 may be immediately flushed to the nonvolatile memory 1200 without being stored in the second random area RA2 for the desired period of time, etc. For example, when write data 1120 having a size exceeding (e.g., greater than) the size of the first random area RA1 is written in the buffer 1110 from the host 10, the portion of the write data 1120 (e.g., a first portion of the write data, etc.) which exceeds and/or is greater than the size of the first random area RA1 (e.g., the size limit of the first random area RA1), for example, the portion of the write data 1120 (e.g., second portion of the write data, etc.) which is stored within the second random area RA2 may be directly flushed to the nonvolatile memory 1200. Accordingly, the second random area RA2 may be referred to as an implicit flush range.

Hereinafter, detailed operations of the storage device 1000 according to some example embodiments will be described. For ease of description, the operations will be described with respect to a single zone Zone1, but the example embodiments are not limited thereto. Accordingly, the write pointer table 1131 will also be illustrated with respect to the single zone Zone1, but the example embodiments are not limited thereto.

Figure 6:
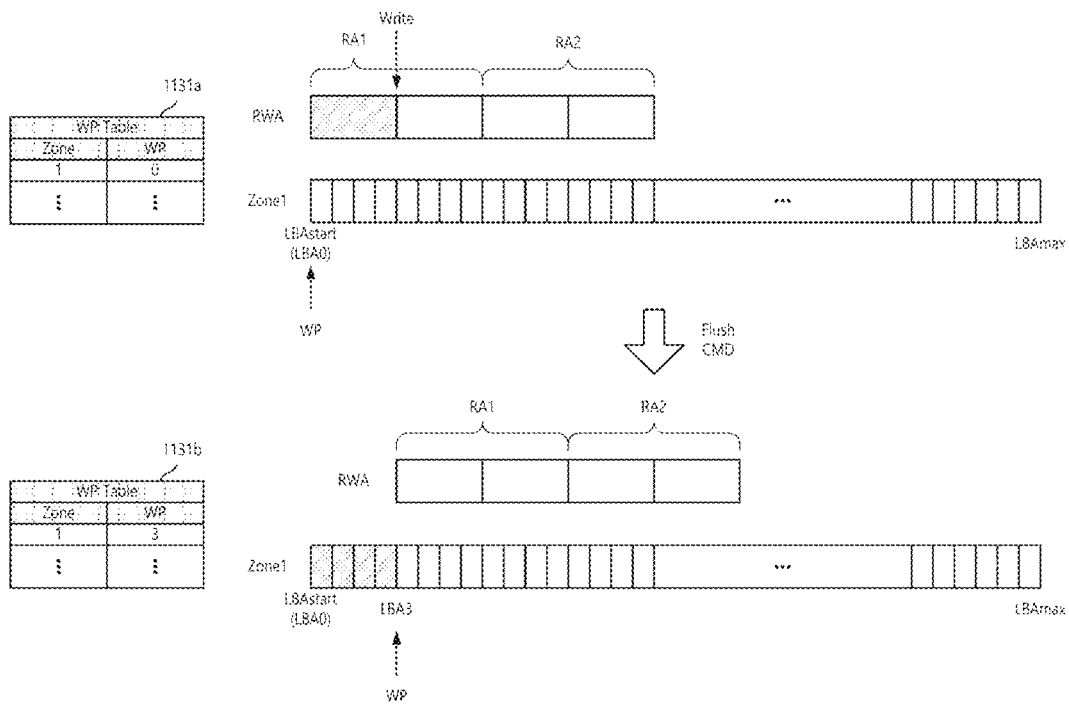
FIG. 6 is a diagram illustrating an explicit flush operation according to at least one example embodiment.

FIG. 6 is a diagram illustrating an explicit flush operation according to at least one example embodiment.

Referring to FIG. 6, when a value (e.g., position value, address value, etc.) of the write pointer 1130 for Zone1 is 0, a random write area RWA may be defined from LBA0, but the example embodiments are not limited thereto. As described above, the random write area RWA may include a first random area RA1 and a second random area RA2, but is not limited thereto, and for example, may include greater than or less than two random write areas. As described above, the random write area RWA may be considered to be a type of area within the buffer 1110 in terms of the buffer 1110, but the random write area RWA is illustrated as being separated from the zone for ease of description, but the example embodiments are not limited thereto.

Write data from the host 10 may be written into the random write area RWA. For example, the write data may be a size which fits within the first random area RA1 (e.g., the size of the write data may be less than or equal to the size of the first random area RA1, etc.). Since the size of the write data does not exceed the size of the first random area RA1, the random write area RWA may store all of the write data.

Then, a flush command Flush CMD may be transmitted from the host 10. The flush command Flush CMD may allow the storage device 1000 to flush user data associated with a specific, indicated, and/or desired namespace or zone and/or meta data to the nonvolatile memory 1200, etc. When receiving the flush command Flush CMD, the storage device 1000 may flush the write data stored in the random write area RWA to the nonvolatile memory 1200 using the storage controller 1100. This may mean that write data is flushed to an area in Zone1 included in the nonvolatile memory 1200 corresponding to the random write area RWA.

For example, when the size of the write data corresponds to four logical blocks as illustrated in the drawing, write data may be flushed to Zone1 of the nonvolatile memory 1200 as four logical blocks, and may then be stored therein. For example, the write data may be stored at physical addresses corresponding to LBA0 to LBA3 in Zone1, but is not limited thereto.

After the flush operation, the write pointer WP is increased by the size of the storage area to which the write data is flushed in Zone1, or in other words, the write pointer WP is incremented based on the size of the write data, etc. For example, the write pointer WP may be updated to indicate LBA3, but is not limited thereto. Accordingly, the storage controller 1100 may update the value and/or position of the write pointer WP corresponding to Zone1 to indicate LBA3 in the write pointer table 1131, and the boundaries of the random write area RWA may be changed and set based on the updated value and/or position of the write pointer WP. For example, a new random write area RWA may be defined as starting from LBA3, but a size of the new random write area RWA may be the same size as the size of the existing random write area RWA, but the example embodiments are not limited thereto.

As described above with reference to FIG. 6, an operation in which the storage device 1000 flushes the write data to the random write area RWA of the zone based on the flash command Flush CMD may be considered to be an explicit flush operation.

Figure 7A:
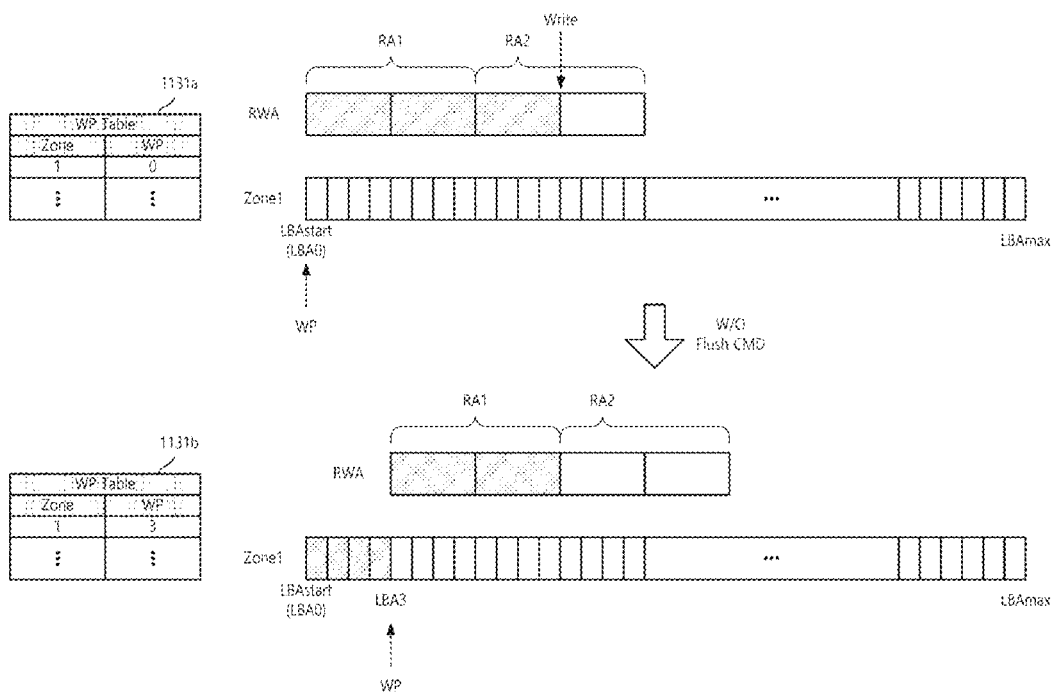
FIGS. 7A and 7B are diagrams illustrating an implicit flush operation according to at least one example embodiment.
Figure 7B:
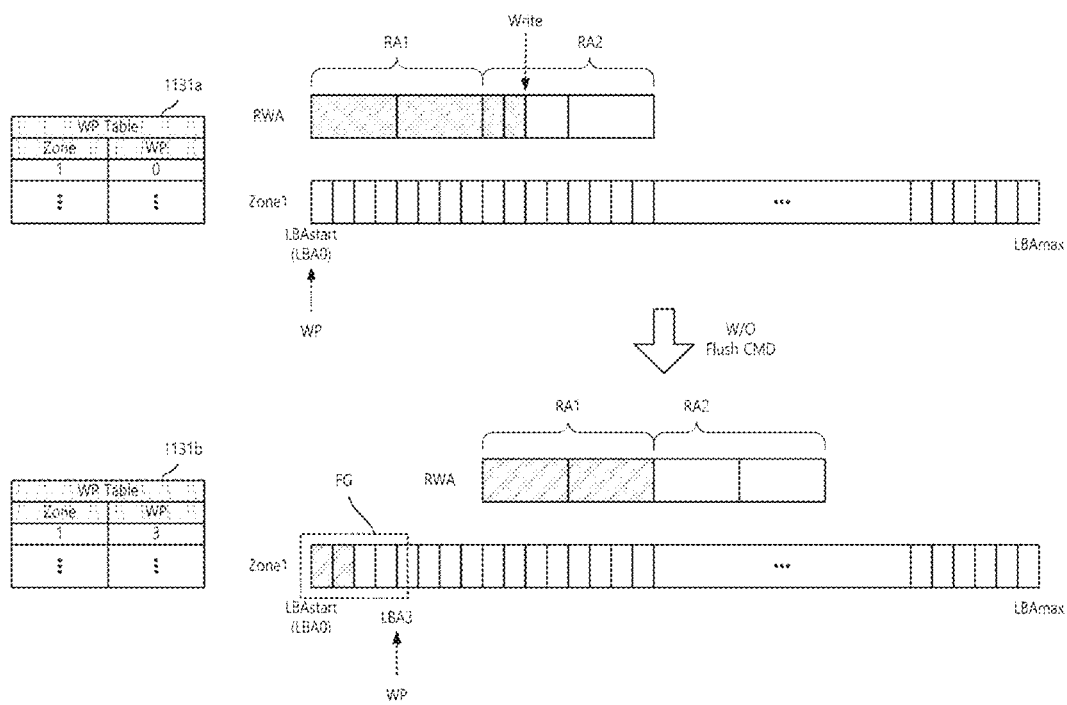

FIGS. 7A and 7B are diagrams illustrating an implicit flush operation according to at least one example embodiment.

Similar to FIG. 6, FIG. 7A illustrates an example in which a random write area RWA is defined from LBA0.

Write data from the host 10 may be written in a random write area RWA. For example, the write data may have a size exceeding (e.g., greater than) the size of a first random area RA1, the write data may be split into at least two portions and a first portion may be written into the first random area RA1 and the second portion may be written into the second random area RA2, etc. When the size of the write data does not exceed the size (e.g., is less than the size) of the first random area RA1, data in the first random area RA1 may be stored in the first random area RA1 as it is.

However, when the data exceeds the first random area RA1, for example, the excess data stored in the second random area RA1 may automatically be flashed to the nonvolatile memory 1200 without transmitting a flush command Flush CMD from the host 10. For example, when the size of the write data written from the host 10 exceeds the size of the first random area RA1, the storage controller 1100 may flush the excess data (e.g., the second portion of data, etc.) to the nonvolatile memory 1200 based on the value and/or position of the write pointer WP.

The storage controller 1100 may flush the excess data to logical blocks corresponding to a random write area RWA starting from a logical address corresponding to a value and/or position of the write pointer WP within a zone of the nonvolatile memory corresponding to and/or associated with the random write area RWA.

For example, when the excess data corresponds to four logical blocks as illustrated in the drawing, write data may be flushed to four logical blocks of Zone1, and may be stored therein, but the example embodiments are not limited thereto. For example, write data may be stored at physical addresses corresponding to LBA0 to LBA3 in Zone1, but is not limited thereto. Unlike FIG. 6, the corresponding write data is not processed using an additional flush command Flush CMD. An operation, in which the corresponding write data is flushed by only a write operation of the host 10 without such a flash command Flush CMD, may be considered to be an implicit flush operation.

After the flush operation, the value and/or position of the write pointer WP is increased and/or incremented based on the size of the storage area to which the write data is flushed in Zone1, etc. The storage controller 1100 may update a value and/or position of the write pointer WP based on the size of the excess write data after the flush operation. For example, the storage controller 1100 may update the value and/or position of the write pointer WP corresponding to Zone1 in the write pointer table 1131 to indicate LBA3, and the boundaries of the random write area RWA may be changed and set based on the value and/or position of the updated write pointer WP. In the random write area RWA, the write data is still stored in the first random area RA1 until an explicit flush operation is received from the host 10, and then the write data stored in the first random area RA1 may be flushed to the nonvolatile memory 1200 according to and/or based on the explicit flush operation.

Similar to FIG. 7A, FIG. 7B illustrates a case in which write data is written in the random write area RWA from the host 10 but exceeds a first random area RA1. Unlike FIG. 7A, FIG. 7B illustrates a case in which the excess write data is smaller than the size of the flush unit FG.

In at least one example embodiment, a flush unit FG (e.g., a desired data size unit associated with and/or corresponding to a flush command, etc.) may be set to a flush operation. The flush unit FG may be set to include, for example, N LBAs (where N is a positive integer), but is not limited thereto. When the flush unit FG is set, an explicit flush operation and/or an implicit flush operation may be performed in units of the flush units FG.

FIG. 7B illustrates an example in which the flush unit FG is set to four logical blocks and a size of the exceeding data is two logical blocks, but the example embodiments are not limited thereto. The excess data may be flushed to Zone1 through an implicit flush operation. Although the size of the exceeding data is two logical blocks, the implicit flush operation may be performed in units of four logical blocks, for example, in flush units FG, but is not limited thereto.

After the flush operation, the value and/or position of the write pointer WP is increased and/or incremented based on a size of the storage area to which the write data is flushed in Zone1, for example, a flush unit FG. The storage controller 1100 may update value and/or position of the write pointer WP by one or more flush units FG, in which the excess write data may be included, after the flush operation. For example, the storage controller 1100 may update the value and/or position of the write pointer WP corresponding to Zone1 in the write pointer table 1131 to indicate LBA3, and the boundaries of the random write area RWA may be changed and set based on the value and/or position of the updated write pointer WP, but the example embodiments are not limited thereto. In the random write area RWA, the write data is still stored in the first random area RA1, and the write data may afterwards be flushed to the nonvolatile memory 1200 according to and/or based on an explicit flush operation received from the host 10.

Figure 8:
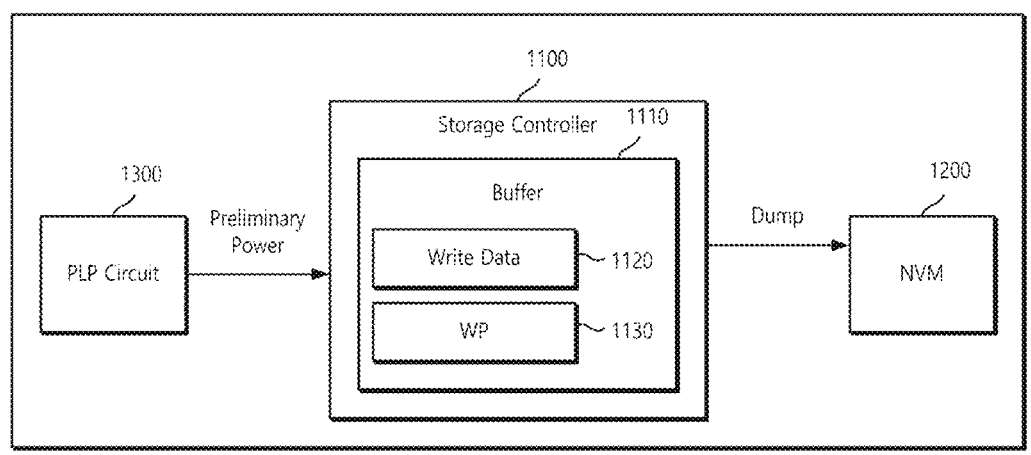
FIG. 8 is a diagram illustrating a storage device supporting power-loss protection (PLP) according to at least one example embodiment.

FIG. 8 is a diagram illustrating a storage device supporting power-loss protection (PLP) according to at least one example embodiment.

Referring to FIG. 8, a storage device 1000_1 according to at least one example embodiment may support a PLP function. A buffer 1110 of the storage device 1000_1 may improve input/output performance and extend the life of the storage device 1000_1, but it may be difficult to guarantee data durability in a situation, such as the occurrence of a sudden power-off (SPO), etc. Accordingly, the storage device 1000_1 may further include a PLP circuit 1300 to decrease and/or prevent power loss, but is not limited thereto.

The PLP circuit 1300 may be configured to detect a power loss event when the power loss event occurs and to supply preliminary, emergency, and/or redundant power to the storage device 1000_1. In this case, the preliminary power supplied by the PLP circuit 1300 may be sufficient to write data stored in the buffer 1110 into a nonvolatile memory 1200.

When a power loss event is detected by the PLP circuit 1300, a storage controller 1100 may receive preliminary power sufficient for dumping data stored in a buffer 1110 to the nonvolatile memory 1200, and the storage controller 1100 may dump the data stored in the buffer 1110. Accordingly, the buffer 1110 may have capability comparable to persistent (e.g., nonvolatile) storage through the use of the PLP circuit 1300. The data dumped to the nonvolatile memory 1200 by the storage controller 1100 may be, for example, user data such as write data 1120 to be written in a random write area RWA and/or metadata such as a write pointer and/or a write pointer table 1131 in which the write pointer is mapped for each zone, etc., but is not limited thereto.

Then, when the power loss event is completed and normal and/or regular supply power is provided to the storage device 1000_1 again, the storage controller 1100 may reload the user data and/or the metadata dumped to the nonvolatile memory 1200 to the buffer 1110. Thus, the host 10 may write data 1120 subsequent to the write data 1120 and/or a write pointer WP previously stored in the buffer 1110 prior to the power interruption event into the buffer 1110 after the normal and/or regular supply power is restored, etc.

Figure 9:
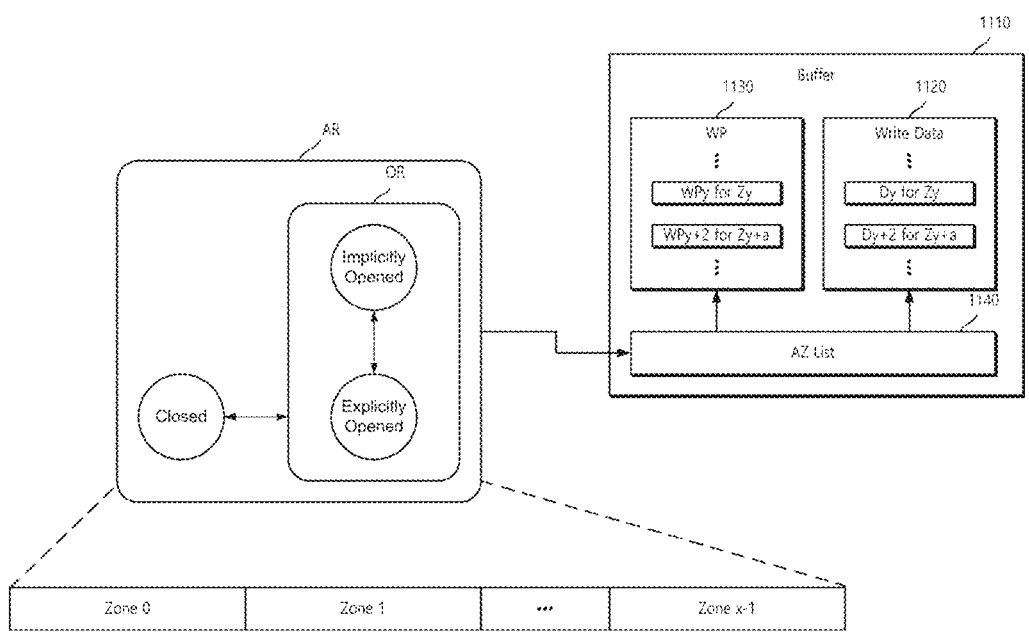
FIG. 9 is a diagram provided to describe an active zone according to at least one example embodiment.

FIG. 9 is a diagram provided to describe an active zone according to at least one example embodiment.

Referring to FIG. 9, a state of a zone included in a storage device according to at least one example embodiment may be represented by a zone state machine (e.g., a state machine). As an example, the state of the zone may initially be an empty state. In the empty state, a write pointer 1130 of the zone may be LBAstart.

Then, the zone may enter an implicitly opened state when there is an available resource in the zone and a write operation is performed according to and/or based on a write command. Additionally, the zone may enter an explicitly opened state through an open command. Then, the zone may enter a closed state from the explicitly opened state when there are no more available resources in the zone, or may enter the closed state from the explicitly opened state through a close command.

As described above, a zone corresponding to the above-mentioned implicitly and explicitly open states may be defined as an open resource OR, and a zone corresponding to the open resource OR and a closed state may be defined as an active resource AR. The active resource AR may be a resource available when opened. The open resource OR may be a currently writable resource. A plurality of zones 1211, 1212, and 1213 may have the same state or different states.

A buffer 1110 according to at least one example embodiment may store an active zone list 1140 which indicates a zone corresponding to an active resource AR in addition to write data 1120 and/or a write pointer 1130, etc. The active zone list 1140 may store information on one or more zones (for example, the active resource AR, etc.) accessible from a host 10 among a plurality of zones, and the active list 1140 may be included in the metadata, etc. A zone corresponding to active resource AR in the zone state machine may be stored and managed in the active zone list 1140, but is not limited thereto. The host 10 may access and/or directly access the buffer 1110 to read the active zone list 1140, and to perform a write operation on the zone corresponding to the active resource AR, etc.

In addition, the write data 1120 and the write pointer 1130 may store only write data 1120 and/or a write pointer 1130 for the zone corresponding to the active resource AR, but the example embodiments are not limited thereto. For example, when a y-th zone Zy and a (y+a)-th zone Zy+a are active resources AR (where "y" and "a" are positive integers, respectively), the buffer 1110 may store write data Dy and a write pointer WPy for the y-th zone Zy and write data Dy+a and a write pointer WPy+a for the (y+a)-th zone Zy+a, but the example embodiments are not limited thereto.

When a state is not an active resource AR, write data 1120 and/or a write pointer 1130 for a zone which is not the active resource AR may be no longer managed by the buffer 1110.

The active zone list 1140 may be flushed to the nonvolatile memory 1200 according to and/or in response to an occurrence of a power loss event, or the like.

Hereinafter, a method of operating a storage device according to at least one example embodiment will be described. Detailed description of overlapping parts will be omitted. In addition, the method will be described with respect to the storage device 1000, but methods according to some example embodiments may be performed using other storage device configurations, such as the storage device 1000_1, etc.

Figure 10:
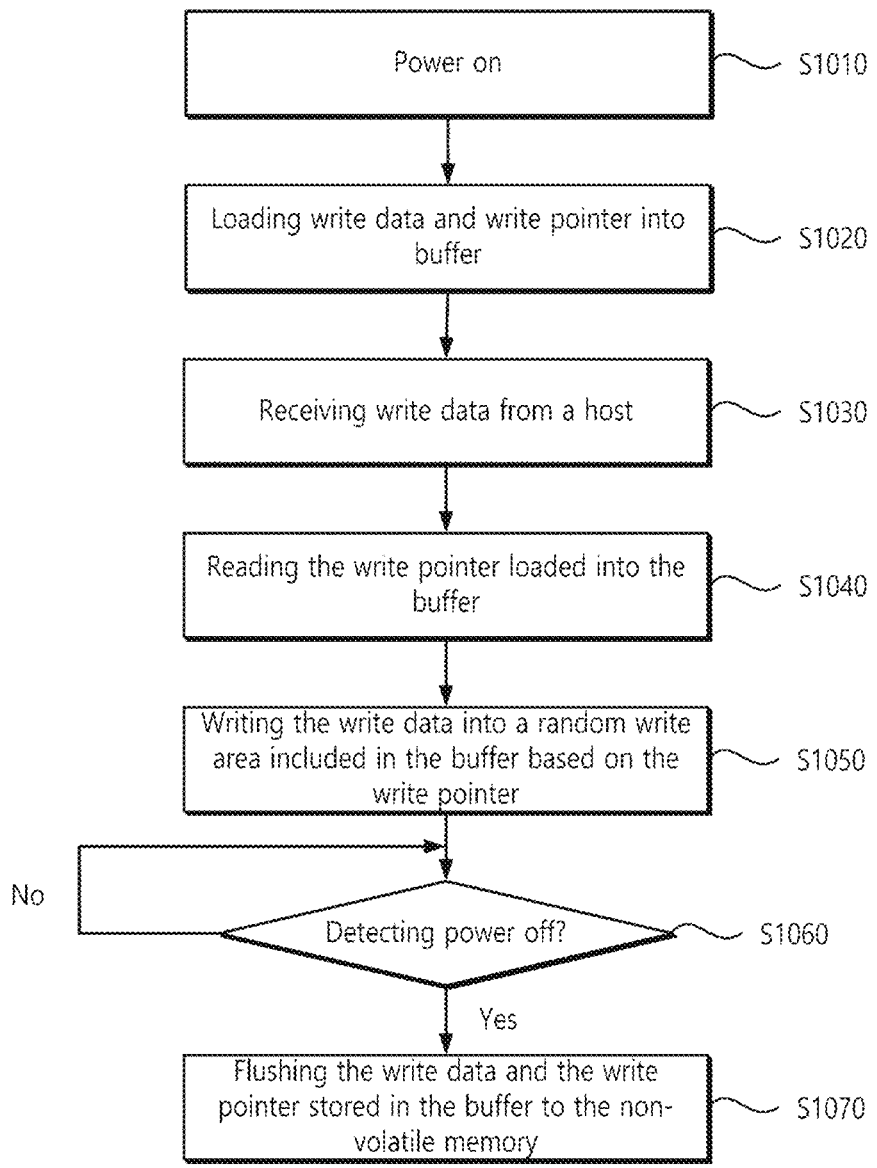
FIG. 10 is a flowchart illustrating a method of operating a storage device according to at least one example embodiment.

FIG. 10 is a flowchart illustrating a method of operating a storage device according to at least one example embodiment.

Referring to FIG. 10, according to at least one example embodiment, in operation s1010, supply power of the storage device 1000 may be turned on, or in other words, the storage device 1000 may receive supply power, etc.

In operation S1020, the storage device 1000 may load the write data 1120 and/or the write pointer 1130 into the buffer 1110. For example, the loaded write data 1120 and the loaded write pointer 1130 may be data which was previously flushed to the nonvolatile memory 1200 through operation S1060 to be described later, or the like.

In operation s1030, the storage device 1000 may receive the write data 1120 from the host 10. The host 10 may directly access the buffer 1110, included in the storage device 1000, to transmit the write data 1120 to the buffer 1110, but the example embodiments are not limited thereto.

In operation s1040, the storage device 1000 may read the write pointer 1130 loaded into the buffer 1110.

In operation S1050, the storage device 1000 may write the write data 1120 in a random write area, included in the buffer 1110, based on the write pointer 1130.

In operation S1060, the storage device 1000 may detect and/or determine whether supply power is turned off. For example, the storage device 1000 may detect whether a power loss event, such as power-off, etc., has occurred. For example, the power loss event may include a situation in which power supply of the storage device 1000 is cut off, such as sudden power-off (SPO), but is not limited thereto.

When the cutoff of the supply power of the storage device 1000 is detected, the storage device 1000 may flush the write data 1120 and the write pointer 1130 stored in the buffer 1110 to the nonvolatile memory 1200, in operation s1070. For example, the storage device 1000 may operate based on preliminary power supplied through the PLP circuit 1300 and/or based on power stored in a backup battery, an uninterruptable power supply (UPS), etc.

The random write area RWA may be defined based on a write pointer 1130 indicating a starting logical address of the random write area RWA among a plurality of logical addresses.

Accordingly, the storage device 1000 may write data in the random write area RWA while significantly reducing a command processing operation, such as an operation of fetching a command, etc., from the host 10.

Figure 11:
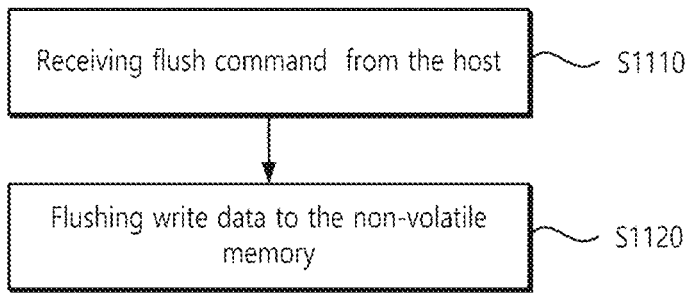
FIG. 11 is a flowchart illustrating an explicit flush operation of a storage device according to at least one example embodiment.

FIG. 11 is a flowchart illustrating an explicit flush operation of a storage device according to at least one example embodiment.

Referring to FIG. 11, according to at least one example embodiment, in operation S1110, the storage device 1000 may receive a flush command Flush CMD from the host 10. The flush command Flush CMD may instruct the storage device 1000 to perform an explicit flush operation.

In operation S1120, the storage device 1000 may flush write data 1120 (e.g., commit write data 1120, transfer write data 1120, etc.) stored in the buffer 1110 to the nonvolatile memory 1200. In at least one example embodiment, when buffer 1110 is enabled, the storage controller 1100 may flush the write data 1120 stored in the buffer 110 and/or metadata (for example, the write pointer table 1131 and/or the active zone list 1140, etc.) to the nonvolatile memory 1200 according to and/or based on the flush command Flush CMD.

Figure 12:
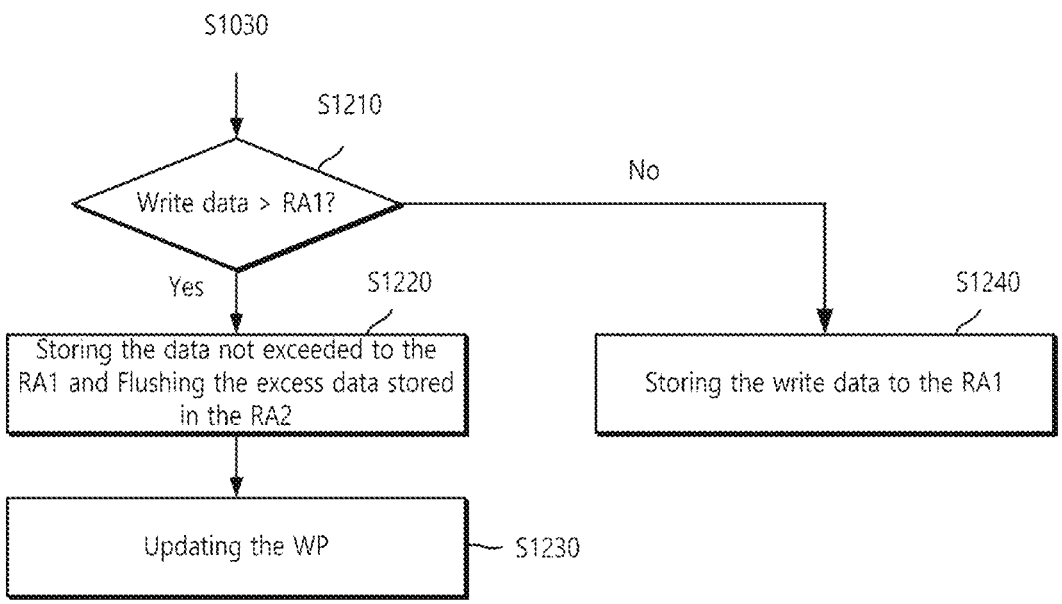
FIG. 12 is a flowchart illustrating an implicit flush operation of a storage device according to at least one example embodiment.

FIG. 12 is a flowchart illustrating an implicit flush operation of a storage device according to at least one example embodiment.

Referring to FIG. 12, when the write data 1120 is received from the host 10 as in operation S1030, the storage device 1000 may determine whether the received write data 1120 exceeds a first random area RA1 in operation S1210.

When the size of the write data 1120 exceeds the size of the first random area RA1, for example, when data is included which overflows to a second random area RA2, the storage device 1000 may store data, which does not exceed the size of the first random area RA1, in the first random area RA1 in operation S1220, or in other words, the storage device 1000 splits the write data 1120 into at least two portions in response to determining that the write data 1120 is greater than the size of the first random area RA1, the first portion having a size equal to or less than the size of the first random area RA1, and the second portion having the remainder of the original write data 1120. Also, the storage device 1000 may flush the exceeding data (e.g., the second portion of the write data 1120) which exceeds the first random area RA1 (e.g., overflows from, is greater than the size of the first random area RA1, etc.), for example, data stored in the second random area RA2 to the nonvolatile memory 1200.

In operation S1230, the storage device 1000 may update the write pointer 1130 changed according to and/or based on the flush operation. For example, the storage controller 1100 may update the write pointer 1130 for a zone in which the flush operation is performed in the write pointer table 1131, etc. In at least one example embodiment, when a flush unit is set (e.g., a desired size unit for the flush operation), updating of the write pointer 1130 may be performed in the flush unit.

When the write data 1120 does not exceed the first random area RA1 (e.g., the size of the write data 1120 is less than or equal to the size of the first random area RA1), the storage device 1000 may transmit data which does not exceed (e.g., fits into) the first random area RA1 into the first random area RA1, in operation S1240. Then, the storage device 1000 may flush the write data 1120 stored in the buffer 1110 to the nonvolatile memory 1200 according to and/or based on an explicit flush operation, such as transmission of the flush command Flush CMD, etc.

Figure 13:
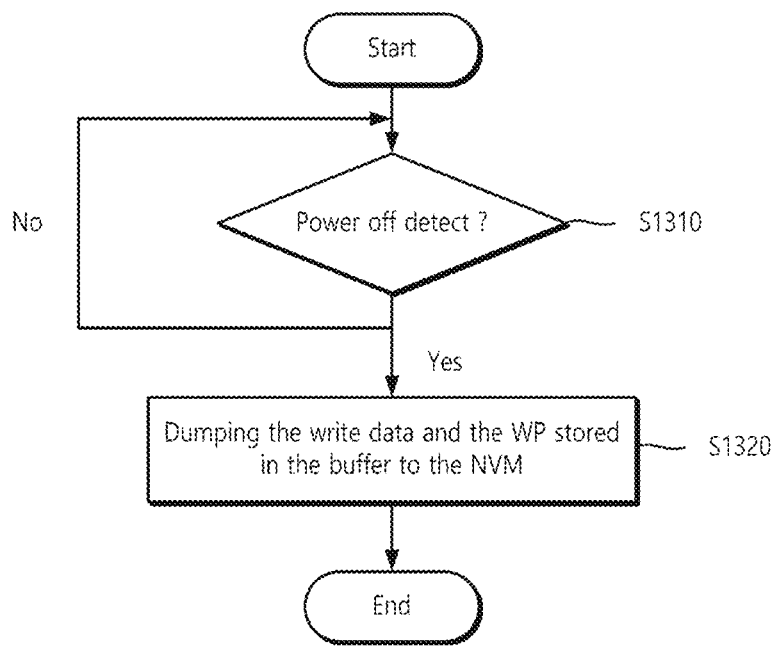
FIG. 13 is a flowchart illustrating a method of operating a storage device according to at least one example embodiment when a power loss event occurs.

FIG. 13 is a flowchart illustrating a method of operating a storage device according to at least one example embodiment when a power loss event occurs.

Referring to FIG. 13, according to at least one example embodiment, in operation S1310, the storage device 1000 may detect and/or determine whether a power loss event, such as power-off, etc., occurs. For example, the power loss event may include a situation in which supply power of the storage device 1000 is cut off, such as SPO, etc.

When power-off is detected through operation S1310, the storage device 1000 may dump the write data 1120 and/or the write pointer 1130 stored in the buffer 1110 to the nonvolatile memory 1200, in operation S1320. In this case, the storage device 1000 may operate based on preliminary power supplied through the PLP circuit 1300 and/or based on power stored in a backup battery, an uninterruptable power supply (UPS), etc.

Figure 14:
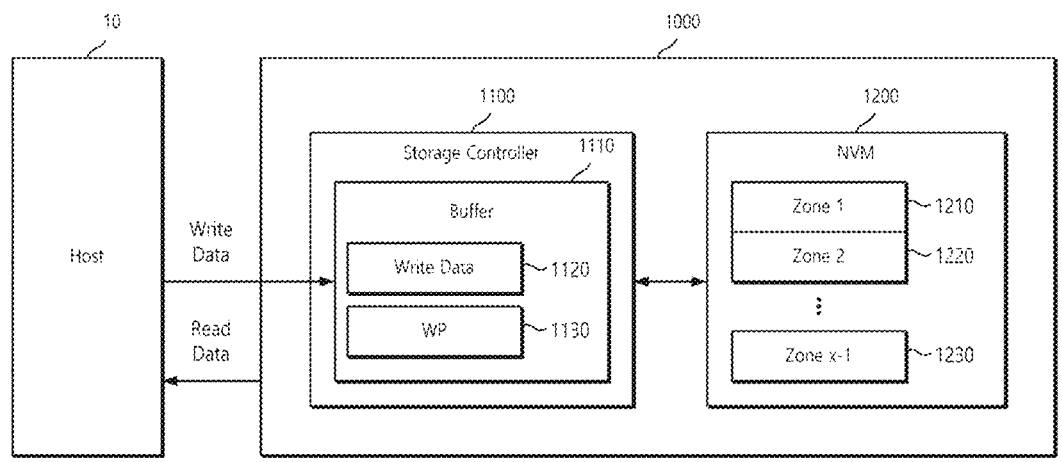
FIG. 14 is a diagram illustrating a storage system according to at least one example embodiment.

FIG. 14 is a diagram illustrating a storage system according to at least one example embodiment.

Referring to FIG. 14, the storage system may include at least one host 10 and/or at least one storage device 1000, etc., but is not limited thereto.

The host 10 (e.g., host device) may communicate with the storage device 1000 through various interfaces. The host 10 may be implemented as and/or may include processing circuitry, such as, an application processor (AP) and/or a system-on-chip (SoC), etc. Also, the host 10 may be implemented as and/or include, for example, an integrated circuit and/or a mainboard, but the example embodiments are not limited thereto. More specifically, the processing circuitry of the host 10 may include hardware or hardware circuit including logic circuits; a hardware/software combination such as a processor executing software and/or firmware; or a combination thereof. The host 10 may further include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc., but is not limited thereto.

In at least one example embodiment, the host 10 may access and/or directly access the buffer 1110 in the storage device 1000 without transmitting and/or receiving commands through an additional command interface, but is not limited thereto. The host 10 may write and/or directly write data 1120 into the buffer 1110. Also, the host 10 may read and/or directly read data stored in the buffer 1110, such as such as the metadata and/or the write data 1120, etc. The host 10 may determine a namespace and/or zone in which write data 1120 is to be written, and may write the write data 1120 in the buffer 1110 for the determined namespace and/or zone, but is not limited thereto.

The host 10 may transmit a read command to the storage device 1000, and may receive read data stored in a nonvolatile memory 1200 of the storage device 1000 in response to the read command. Additionally, the host 10 may transmit an erase command to the storage device 1000, and the storage device 1000 may perform an erase operation on data stored in a memory area specified in the erase command, etc.

The host 10 may transmit a flush command Flush CMD to the storage device 1000. In this case, the storage device 1000 may perform an explicit flush process.

The storage device 1000 may perform a write, read, erase, and/or flush operation, etc., under the control of the host 10. In at least one example embodiment, the storage device 1000 may store write data 1120, transferred from the host 10, in the buffer 1110. When the write data 1120 transferred from the host 10 exceeds a first random area RA1, the storage device 1000 may implicitly flush the data exceeding the first random area RA1, etc.

The storage device 1000 may update a write pointer 1130 indicating a starting logical address of the random write area RWA. For example, when the write pointer 1130 is changed through a flush operation, the storage device 1000 may update the write pointer table 1131 with the changed write pointer 1130, etc.

Figure 15:
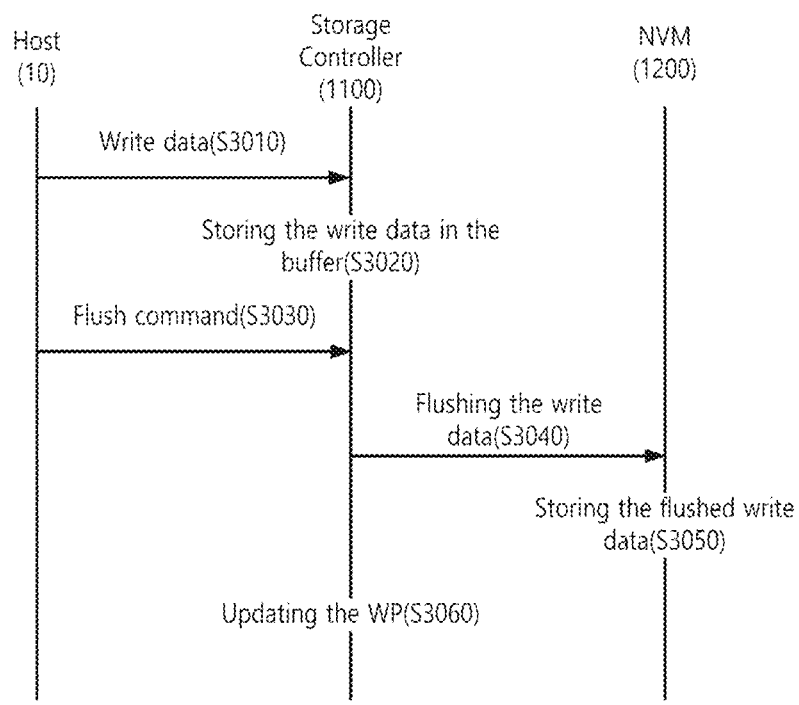
FIG. 15 is a flowchart illustrating an explicit flush operation of a storage system according to at least one example embodiment.

FIG. 15 is a flowchart illustrating an explicit flush operation of a storage system according to at least one example embodiment.

Referring to FIG. 15, in operation S3010, the host 10 may transmit write data 1120 to be written in the random write area RWA to a storage controller 1100, but the example embodiments are not limited thereto. For example, the host 10 may write the write data 1120 in an accessible buffer 1110 included in the storage controller 1100, but is not limited thereto.

In operation S3020, the storage controller 1100 may store the write data 1120 transferred from the host 10 in the buffer 1110.

In operation S3030, the host 10 may transmit a flush command Flush CMD to the storage controller 1100.

In operation S3040, the storage controller 1100 may flush the write data 1120 stored in the buffer 1110 to a nonvolatile memory 1200 according to and/or based on the flush command Flush CMD.

In operation S3050, the nonvolatile memory 1200 may store the flushed write data 1120 in a random write area RWA.

In operation S3060, the storage controller 1100 may update a write pointer 1130 changed according to and/or based on the flush operation. Simultaneously and/or sequentially, the random write area RWA may also be changed. Operation S3060 may be performed between operations S3040 and S3050, or may be performed together with operation S3050. The updated write pointer 1130 may be stored in the write pointer table 1131 of the buffer 1110.

Figure 16:
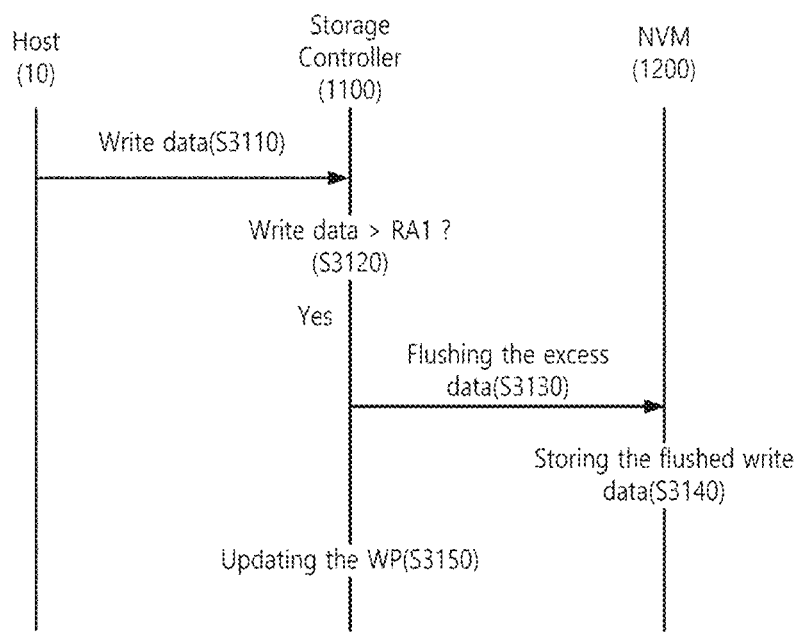
FIG. 16 is a flowchart illustrating an implicit flush operation of a storage system according to at least one example embodiment.

FIG. 16 is a flowchart illustrating an implicit flush operation of a storage system according to at least one example embodiment.

Referring to FIG. 16, in at least one example embodiment, in operation S3110, the host 10 may transmit write data 1120 to be written in the random write area RWA to the storage controller 1100. For example, the host 10 may write the write data 1120 in an accessible buffer 1110 included in the storage controller 1100, but the example embodiments are not limited thereto.

In operation S3120, the storage controller 1100 may determine whether the write data 1120 written in the buffer 1110 exceeds the size of a first random area RA1, or in other words, the storage controller 1100 may determine whether the size of the write data 1120 is larger than the size of the first random area RA1.

When the write data 1120 exceeds the first random area RA1, the storage controller 1100 may flush the portion of the write data 1120 which exceeds the total size of the first random area RA1 to the nonvolatile memory 1200 in operation S3130. Operation S3130 may be performed according to a desired and/or preset flush unit (e.g., a unit of size associated with the flush operation).

In operation S3140, the nonvolatile memory 1200 may store the flushed data.

In operation S3150, the storage controller 1100 may update a write pointer 1130 changed according to and/or based on the flush operation. Simultaneously (or sequentially), the random write area RWA may also be changed. Operation S3150 may be performed between operations S3130 and S3140, or may be performed together with operation S3140. The updated write pointer 1130 may be stored in the write pointer table 1131 of the buffer 1110, but is not limited thereto.

Figure 17:
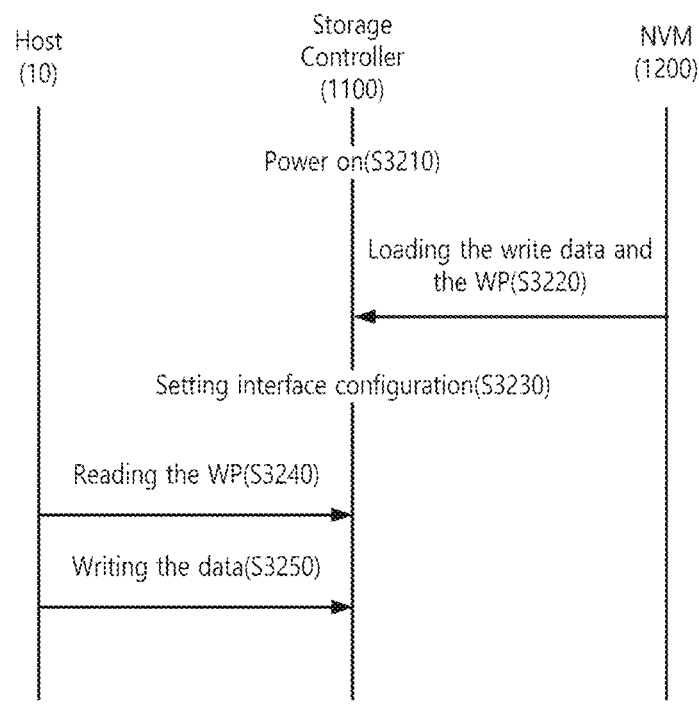
FIG. 17 is a flowchart illustrating a method of operating a storage system according to at least one example embodiment when power is supplied.

FIG. 17 is a flowchart illustrating a method of operating a storage system according to at least one example embodiment when power is supplied.

Referring to FIG. 17, in at least one example embodiment, in operation S3210, power may be supplied to the storage device 1000 including the storage controller 1100. In other words, the storage device 1000 may receive power.

When power is supplied, the storage controller 1100 may read the write data 1120 and/or the write pointer 1130 stored in the nonvolatile memory 1200 and may load the write data 1120 and/or the write pointer 1130 into the buffer 1110 in operation S3220.

In operation S3230, the storage controller 1100 may set one or more interface-related settings. For example, the storage controller 1100 may set various interfaces (for example, PCIe, NVMe, or the like) between the host 10 and the storage device 1000 to use a buffer 1110, directly accessible from the host 10, but the example embodiments are not limited thereto.

In operation S3240, the host 10 may read the write pointer 1130 loaded and/or stored in the buffer 1110.

In operation S3250, the host 10 may write data to be written in the random write area RWA based on the read write pointer 1130.

As described above, according to some example embodiments, a storage device supporting a random write area accessible from a host, a system including the storage device, and/or a method of operating the storage device may be provided.

While various example embodiments of the inventive concepts have been shown and described above, it will be apparent to those of ordinary skill in the art that modifications and variations could be made without departing from the scope of the inventive concepts as defined by the appended claims.

What is claimed is:

1. A storage device comprising:
   a nonvolatile memory device including a plurality of zones and a plurality of random write areas, each of the plurality of zones including a plurality of logical addresses, each of the plurality of zones corresponding to one of the plurality of random write areas; and
   a storage controller configured to control the nonvolatile memory device, the storage controller including at least one buffer directly accessible by a host device,
   wherein the at least one buffer includes write data and a plurality of write pointers each corresponding to a random write area of the plurality of random write areas,
      each of the plurality of write pointers is configured to store a position indicating a starting logical address of a corresponding random write area in the plurality of zones, the corresponding random write area including at least a first random area and a second random area, the second random area defined sequentially from the first random area, the write data is stored in the at least one buffer corresponding to a logical address corresponding to the plurality of write pointers, and the at least one buffer is configured to store the write data in the at least one buffer in response to an access by the host device, and wherein the storage controller is further configured to, flush at least a first portion of the write data to the nonvolatile memory device based on a position of a write pointer without receiving a flush instruction from the host device in response to a size of the write data being greater than a size of the first random area, the first portion of the write data being a portion of the write data which is greater than the size of the first random area, store a second portion of the write data in the at least one buffer, a size of the second portion of the write data being equal to the size of the first random area, update the write pointer by a size of a storage area to which the first portion of the write data is flushed in one of the plurality of zones, and update the starting logical address of the corresponding random write area corresponding to the updated write pointer, the updated starting logical address of the corresponding random write area defined as starting from a logical address corresponding to the updated write pointer.

2. The storage device of claim 1, wherein
the at least one buffer is further configured to store a write pointer table; and
the write pointer table is configured to store a plurality of starting logical addresses corresponding to the plurality of zones.

3. The storage device of claim 1, wherein
the at least one buffer is further configured to store data to be written into each of the plurality of zones.

4. The storage device of claim 1, wherein
the plurality of zones includes one or more host device accessible zones, the one or more host device accessible zones configured to be accessible by the host device; and
the at least one buffer is further configured to store information associated with the one or more host device accessible zones.

5. The storage device of claim 1, wherein
the write data includes at least one of redundant array of inexpensive disk (RAID) parity data, system log data, or a combination thereof.

6. The storage device of claim 1, wherein
the at least one buffer is further configured to store the write data received directly from the host device.

7. The storage device of claim 1, wherein
the storage controller is further configured to flush the write data to the nonvolatile memory device in response to receiving a flush command from the host device.

8. The storage device of claim 1, wherein
the first random area and the second random area have a same size.

9. The storage device of claim 1, wherein the storage controller is further configured to:
update the position of the write pointer based on the size of the second portion of the write data after performance of the flush.

10. The storage device of claim 9, wherein
in response to the write pointer being updated, the corresponding random write area is set based on the updated write pointer.

11. The storage device of claim 9, wherein
the storage controller is further configured to update the position of the write pointer by one or more flush data size units based on the size of the second portion of the write data in response to a flush data size unit being set for the flush.

12. A method of operating a storage device controlling a nonvolatile memory device, the method comprising:
receiving write data from a host device;
reading a position of a write pointer of a plurality of write pointers loaded into a buffer, each of the plurality of write pointers storing a position indicating a starting logical address of a corresponding random write area of a plurality of random write areas, the corresponding random write area including at least a first random area and a second random area, the second random area defined sequentially from the first random area;
storing the write data in the buffer in response to an access by the host device, the write data stored in the buffer corresponding to the starting logical address corresponding to the plurality of write pointers; and
flushing the write data and the write pointer to the nonvolatile memory device in response to detection of an interruption of power supplied to the storage device,
wherein each of the plurality of random write areas corresponds to a plurality of zones of the nonvolatile memory device, each of the plurality of zones including a plurality of logical addresses, the method further including,
updating the write pointer by a size of a storage area to which the write data is flushed in one of the plurality of zones; and
updating the starting logical address of the corresponding random write area corresponding to the updated write pointer, the updated starting logical address of the corresponding random write area defined as starting from a logical address corresponding to the updated write pointer, and
wherein the method further comprises,
flushing at least a first portion of the write data to the nonvolatile memory device based on the position of the write pointer without receiving a flush instruction from the host device in response to a size of the write data being greater than a size of the first random area, the first portion of the write data being a portion of the write data which is greater than the size of the first random area; and
storing a second portion of the write data in the buffer, a size of the second portion of the write data being equal to the size of the first random area.

13. The method of claim 12, further comprising:
loading the write data and the write pointer from the nonvolatile memory device to the buffer in response to power of the storage device being restored.

14. The method of claim 12, further comprising:
receiving a flush command from the host device.

15. The method of claim 12, further comprising:
updating the position of the write pointer based on the size of the second portion of the write data after the flushing.

16. A storage system comprising:
a host device; and
a storage device connected to the host device,
the storage device including,
- a nonvolatile memory device including a plurality of zones and a plurality of random write areas, each of the plurality of zones including a plurality of logical addresses, each of the plurality of zones corresponding to one of the plurality of random write areas; and
- a storage controller including a buffer, the storage controller configured to control the nonvolatile memory device, the buffer configured to be directly accessible from the host device, wherein
the buffer includes write data and a plurality of write pointers each corresponding to a random write area of the plurality of random write areas, the corresponding random write area including at least a first random area and a second random area, the second random area defined sequentially from the first random area,
each of the plurality of write pointers is configured to store a position indicating a starting logical address of the corresponding random write area in the plurality of zones,
the write data is stored in the buffer corresponding to a logical address corresponding to the plurality of write pointers,
the buffer is further configured to store the write data in the buffer in response to an access by the host device,
wherein the host device is configured to transmit the write data to the storage device, and
wherein the storage controller further configured to,
- flush at least a first portion of the write data to the nonvolatile memory device based on the position of a write pointer of the plurality of write pointers without receiving a flush instruction from the host device in response to a size of the write data being greater than a size of the first random area, the first portion of the write data being a portion of the write data which is greater than the size of the first random area,
- store a second portion of the write data in the buffer, a size of the second portion of the write data being equal to the size of the first random area,
- update the write pointer by a size of a storage area to which the first portion of the write data is flushed in one of the plurality of zones, and
- update the starting logical address of the corresponding random write area corresponding to the updated write pointer, the updated starting logical address of the corresponding random write area defined as starting from a logical address corresponding to the updated write pointer.

17. The storage system of claim 16, wherein
the host device is configured to transmit a flush command to the storage device; and
the storage device is further configured to flush the write data from the buffer to the nonvolatile memory device in response to the storage device receiving the flush command.

* * * * *